United States Patent [19]

Leatherman et al.

[11] Patent Number: 5,719,781

[45] Date of Patent: Feb. 17, 1998

[54] TRANSACTION DISPLAY ON VIDEO/GRAPHICS IN FUEL DISPENSERS

[75] Inventors: Russel D. Leatherman, Summerfield; Walter L. Baker, III, Greensboro, both of N.C.

[73] Assignee: Gilbarco Inc., Greensboro, N.C.

[21] Appl. No.: 459,662

[22] Filed: Jun. 2, 1995

Related U.S. Application Data

[63] Continuation-in-part of Ser. No. 960,512, Oct. 13, 1992, abandoned.

[51] Int. Cl.$^6$ .................................................. G06F 17/00
[52] U.S. Cl. ............................. 364/479.02; 364/479.07
[58] Field of Search .................... 364/465, 479.01, 364/479.02, 479.06, 479.07, 479.11, 479.14, 464.23; 395/154, 155, 161, 216, 217; 235/381, 94 A; 455/66; 222/23, 25-28, 39, 52

[56] References Cited

U.S. PATENT DOCUMENTS

| | | | |
|---|---|---|---|
| 3,345,458 | 10/1967 | Cole et al. | 178/6.8 |
| 3,549,793 | 12/1970 | Ross | 178/5.4 |
| 3,710,017 | 1/1973 | Abe et al. | 178/6.8 |
| 3,898,644 | 8/1975 | Baxter | 340/324 |
| 3,936,868 | 2/1976 | Thorpe | 358/22 |
| 3,949,207 | 4/1976 | Savary et al. | 235/151 |
| 4,001,498 | 1/1977 | Morshita et al. | 358/160 |
| 4,070,695 | 1/1978 | Scholz et al. | 358/181 |
| 4,185,300 | 1/1980 | Miyake et al. | 358/183 |
| 4,218,698 | 8/1980 | Bart et al. | 358/22 |
| 4,395,627 | 7/1983 | Barker et al. | 253/381 |
| 4,498,098 | 2/1985 | Stell | 358/22 |
| 4,568,976 | 2/1986 | Trammell | 358/148 |
| 4,577,229 | 3/1986 | Cierva et al. | 358/182 |
| 4,589,069 | 5/1986 | Endo et al. | 364/405 |
| 4,591,898 | 5/1986 | de Boer et al. | 358/36 |
| 4,630,754 | 12/1986 | Komukai | 222/28 |
| 4,631,588 | 12/1986 | Barnes et al. | 358/149 |
| 4,639,765 | 1/1987 | D'Hont | 358/19 |
| 4,644,401 | 2/1987 | Gaskins | 358/183 |
| 4,658,371 | 4/1987 | Walsh et al. | 364/550 |
| 4,680,622 | 7/1987 | Barnes et al. | 358/22 |
| 4,750,130 | 6/1988 | Shimamura et al. | 364/465 |
| 4,782,401 | 11/1988 | Faerber et al. | 358/335 |
| 4,843,547 | 6/1989 | Fuyama et al. | 364/405 |
| 4,999,709 | 3/1991 | Yamazaki et al. | 358/160 |
| 5,027,211 | 6/1991 | Robertson | 358/183 |
| 5,027,282 | 6/1991 | Hollidge | 364/479 |
| 5,134,716 | 7/1992 | Craig | 455/66 |
| 5,235,509 | 8/1993 | Mueller et al. | 364/405 |
| 5,353,219 | 10/1994 | Mueller et al. | 364/405 |
| 5,394,336 | 2/1995 | Warn et al. | 364/479.02 |

FOREIGN PATENT DOCUMENTS

| | | |
|---|---|---|
| 617588 | 8/1990 | Australia . |
| 0 284 764 | 10/1988 | European Pat. Off. . |
| 0 366 871 | 5/1990 | European Pat. Off. . |
| 1496984 | 1/1978 | United Kingdom . |
| WO89/00974 PCT/ | 2/1987 | WIPO ................. B67D 5/08 |
| GB8800651 PCT/ | 2/1989 | WIPO . |
| AU8900051 | 8/1989 | WIPO . |

Primary Examiner—Reba I. Elmore
Assistant Examiner—Steven R. Garland
Attorney, Agent, or Firm—Rhodes Coats & Bennett, L.L.P.

[57] ABSTRACT

An apparatus for dispensing fuel at a retail site includes a fuel dispenser having a raster-scannable display of information to a customer, a first circuit to generate graphics information concerning fueling data for display on the raster-scannable display, a second circuit to generate user prompts for display on the raster-scannable display, a video signal source supplying video signals to the fuel dispenser to be displayed on the raster-scannable display, and a third circuit to direct fueling data from the first circuit, user prompts from the second circuit and video signals from the video signal source selectively to the raster-scannable display.

25 Claims, 4 Drawing Sheets

TRANSACTION DISPLAY ON VIDEO/GRAPHICS IN FUEL DISPENSERS

BACKGROUND OF THE INVENTION

This application is a continuation in part of U.S. patent application Ser. No. 07/960,512 filed Oct. 13, 1992 entitled "Multimedia Video/Graphics in Fuel Dispensers" of Leatherman et al., now abandoned in favor of File Wrapper Continuation application Ser. No. 08/539,505, filed Oct. 6, 1995 entitled "Multimedia Video/Graphics in Fuel Dispensers".

The present invention relates to an improved multimedia display for raster-scannable displays, and the provision of multimedia displays in gasoline dispensers.

Gasoline dispensers have evolved over the years from having mechanical dial readouts to LED displays to more recent liquid crystal displays. They have also evolved by having enhanced internal controller technology, including recent advances by Gilbarco, Inc. in the marketing of its THE ADVANTAGE™ line of fuel dispensers. These dispensers include card readers to enable credit cards to be read by the gas dispenser, with communications back to the credit card issuer to ascertain if the credit card is valid. However, some customers have difficulty using the technology because of lack of familiarity with the procedures required. Accordingly, it would be helpful to users of that sort to have assistance to direct them in the use of the self-service dispenser. Also, for all users, the option of advertising additional products or services for sale would be desirable to the service station operator. One way to do this is with a video screen display in the dispenser to provide information to the customer A prior effort to provide a video screen prompt of this sort is disclosed in U.S. Pat. No. 5,027,282 to Hollidge. The Hollidge approach is designed to control all display functions of the entire dispenser by a video disk player, which outputs video images to the screen, with some interactivity between the user and the disk being made possible.

The invention disclosed in U.S. patent application Ser. No. 07/960,512 filed Oct. 13, 1992 entitled "Multimedia Video/Graphics in Fuel Dispensers" of Leatherman et al. permits advertisements or other programming to be played to the customer during the fueling operation. In fact, that invention, by being tied in with other service station operation, permits overall enhancement of the marketing of service station capabilities.

Also, that invention has advantages over the prior displays which displayed only single line instructions or data to a customer. Instead, instructions are given in a Video format, with which there is widespread familiarity, rather than a display using technologies such as LCD's or LED's. Customer ease-of-use is enhanced, not to mention the very much increased versatility of the types of displays capable on a raster-scannable display. Even for simple word messages, fonts can be customized, logos can be included, and the like.

The invention of U.S. patent application Ser. No. 07/960,512 filed Oct. 13, 1992 entitled "Multimedia Video/Graphics in Fuel Dispensers" of Leatherman et al. contemplates a multimedia type display, including both video display of prerecorded or live video programming, as well as graphics-generated display pertinent to assist the customer in the stages of a fueling transaction or otherwise to interface with the customer, such as to present advertising. The display of both of these types of information on a single screen entails displaying both analog video signals as well as digital computer signals. Prior efforts to display both types of signals at once have almost invariably entailed the digitization of the video signal, requiring large amounts of memories and very high speed electronics, thus adding greatly to the cost. For a mass production, low cost item, the implementation of such expensive technologies is undesirable.

That invention, though, was best suited for side-by-side displays of the advertising message on the video screen and conventional transaction information, (such as the price per gallon sold, the number of gallons and the transaction cost) on conventional LED or LCD displays. With the advent of larger active matrix displays, it would be advantageous to combine the transaction information and the promotional message on one display.

SUMMARY OF THE INVENTION

The present invention provides an apparatus for dispensing fuel at a retail site including a fuel dispenser having a raster-scannable display of information to a customer, a first circuit to generate graphics information concerning fueling data for display on the raster-scannable display, a second circuit to generate user prompts for display on the raster-scannable display, a video signal source supplying video signals to the fuel dispenser to be displayed on the raster-scannable display, and a third circuit to direct fueling data from the first circuit, user prompts from the second circuit and video signals from the video signal source selectively to the raster-scannable display.

Typically, the video signals are analog signals as directed to the raster-scannable display. Preferably, the fuel dispenser has a user-actuable portion to permit responses to the prompts to be communicated to the second circuit. Also preferably, the dispenser has a fuel meter communicating data about fuel dispensed to the first and second circuits.

The second circuit may be associated with a reader for cards having magnetic stripes and may have a communications link to an external card-verifying authority.

The apparatus may include a printer, with the second circuit having a communications rink to the printer.

The third circuit may selectively direct graphics information concerning fueling data, graphics information of user prompts or video signals or a combination of them to the raster-scannable display, as instructed by signals provided by the first circuit.

The third circuit may use synchronization signals in the video signals to establish graphics information signals synchronized with the video signals.

The third circuit may provide signals to determine the placement of graphics information concerning fueling data on the raster-scannable display with video information and use signals provided by the second circuit to determine the placement of graphics information concerning transactions on the raster-scannable display with video information. The third circuit may convert either the video or the graphics signals to be compatible with the other, such as both RGB, both Composite video or both S-Video.

Desirably, each of the first, second and third circuits includes a microprocessor. The raster-scannable display is preferably a liquid crystal display.

Preferably, the system includes a plurality of the fuel dispensers and the video signal source supplies the same video signal to all of the plurality of fuel dispensers.

The invention also provides a method of dispensing fuel at a retail site including providing a fuel dispenser having a raster-scannable display of information, generating graphics information concerning fueling transactions for display on the raster-scannable display, generating graphics information concerning user prompts for display on the raster-scannable display, supplying video signals to the fuel dispenser to be displayed on the raster-scannable display, and selectively directing graphics information concerning fueling transactions, user prompts or video signals or a combination of them to the raster-scannable display.

The supplying step typically includes supplying the video signals as analog signals.

Preferably, the fuel dispenser has a user-actuable portion and the method includes communicating responses through the portion to affect the graphics information.

Typically, the invention includes communicating data about fuel dispensed from a fuel meter to affect the graphics information concerning fueling transactions.

The method may include reading information on cards having magnetic stripes and processing the magnetic stripe information to affect the graphics information concerning user prompts. If so, the method may also include communicating magnetic stripe information to an external card-verifying authority.

The method may include detecting beginnings of video programs in the video signals and starting to direct video signals to the raster-scannable display only at detected program beginnings. It may also include identifying synchronization signals in the video signals and establishing graphics information signals synchronized with the video signals.

In a preferred embodiment the invention includes determining the relative placement of graphics information concerning fueling transactions and the placement of graphics information concerning user prompts on the raster-scannable display with video information and effecting placement of the information concerning fueling data and the information concerning user prompts in relation to the video on the raster-scannable display on the basis of such determination.

Desirably, the method also includes converting one of the video or graphics signals to be compatible with the other one of the video or graphics signals, such as both RGB, both Composite video or both S-Video.

Typically, the supplying step includes supplying a plurality of the fuel dispensers with the same video signal.

BRIEF DESCRIPTION OF THE DRAWINGS

The invention will be better understood after a reading of the Detailed Description of the Preferred Embodiments and a review of the drawings in which.

DETAILED DESCRIPTION OF THE PREFERRED EMBODIMENTS

Figure 1:
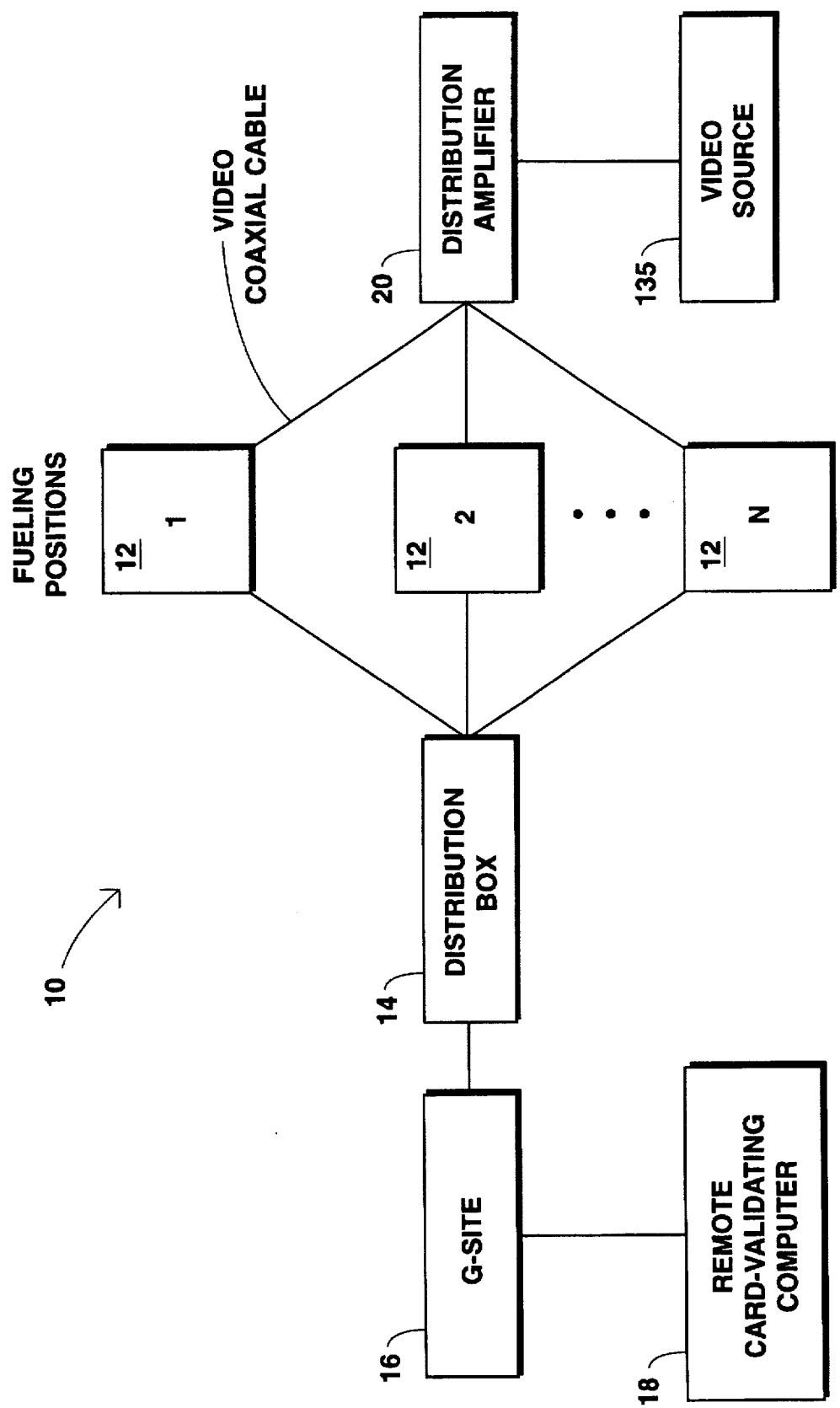
FIG. 1 is a block diagram of a service station illustrating major components of a preferred embodiment according to the present invention as linked together.

As seen in FIG. 1, a service station 10 has on site a plurality of fuel dispensers 12 connected through a single distribution box 14 to a site controller 16. The site controller 16 is preferably the G-Site system controller sold by Gilbarco, Inc. of Greensboro, N.C. The controller 16 serves as an overall system controller for the multiplicity of fuel dispensers 12. It has a link to a remote credit- or debit-card-validating computer 18, such as a telephone link. The computer 18 may be hundreds or thousands of miles away from the service station, at the site of a card-issuing authority or the like.

The relationships of the dispensers 12, distribution box 14, controller 16, and computer 18 are conventional as regards the card-validating function. The controller 16 serves as a point-of-sale device somewhat like a cash register manned by an attendant, typically located in a store facility.

Each of the dispensers 12 is supplied with a video signal from a video source 135 through a distribution amplifier 20. It should be appreciated that each of the dispensers 12 is supplied with exactly the same signal, decreasing the investment required in video sources 135. Alternatively, of course, multiple video sources could be provided if desired. However, an important advantage of the invention is that it makes possible the use of only a single source. The source may be any conventional source of video signals such as a video tape recorder, a video disk, a live camera, an over-the-air or over-cable reception, or the like. The video may be any desired format such as RGB, Composite video or S-Video.

Figure 2:
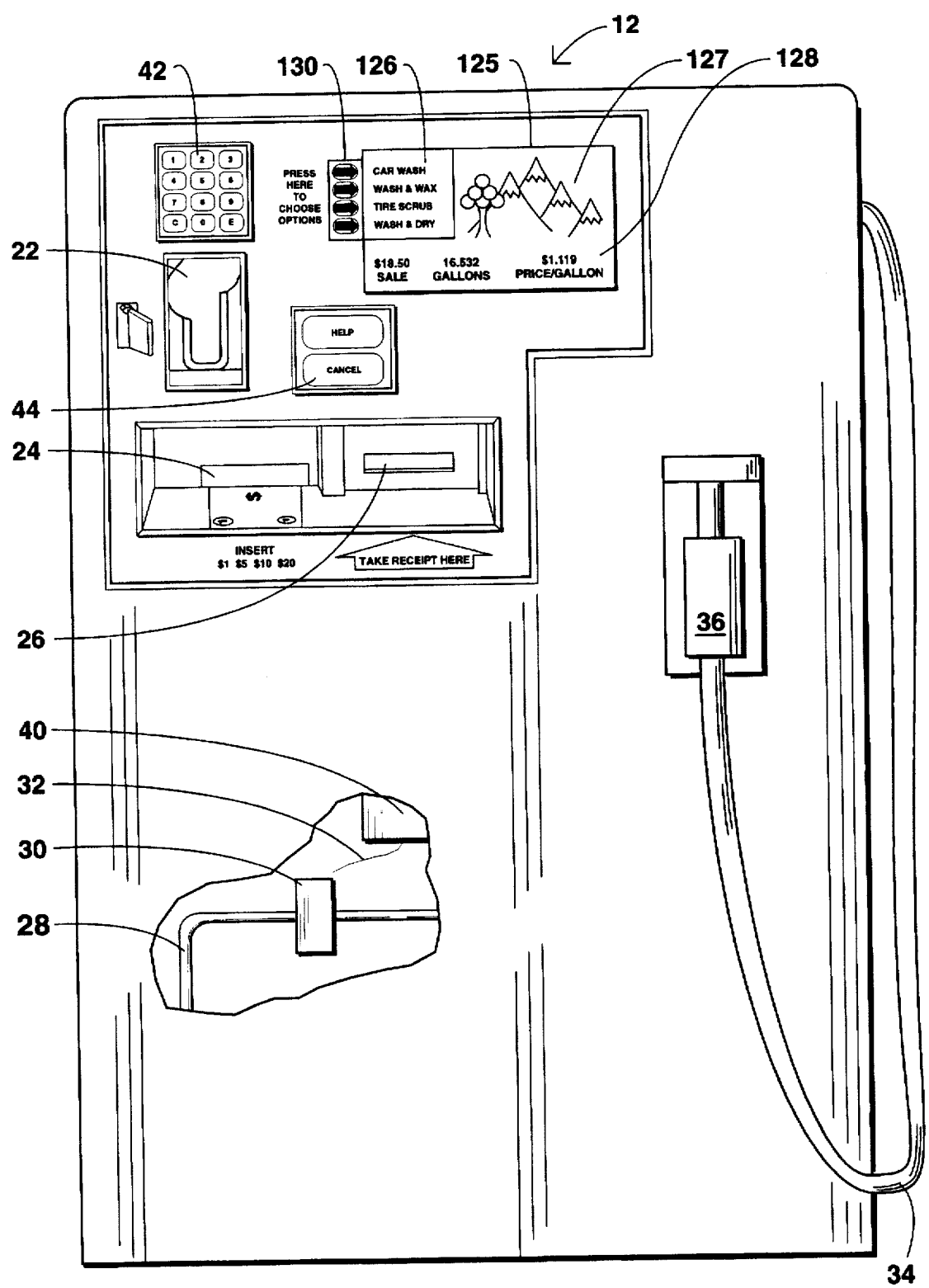
FIG. 2 is an elevational view of a fuel dispenser of FIG. 1, partially broken away.

Turning now to FIG. 2 which shows an elevational view of one of the dispensers 12, the dispenser includes a conventional nozzle 36 connected through a hose 34 to the dispenser housing, for dispensing gasoline or other fuel in a conventional fashion. The fuel is supplied from an underground reservoir through a conduit 28 to the hose 34 under the influence of a submerged pump 27, shown schematically in FIG. 3. A metering device 30 from the conduit 28 ascertains the volume of fuel delivered through the conduit 28 and communicates that data over a line 32 to microprocessor 40 in the dispenser 12. The volume is, of course, used to compute and display the transaction data.

The dispenser may also include a magnetic stripe card reader 22, a cash accepter 24, and a receipt printer 26, all of any desired design.

Referring to FIG. 2, the video screen 125 can be seen displaying in a portion of the screen 126 information concerning a carwash transaction which can be elected by a customer in combination with a fueling transaction. The screen 125 may be any suitable raster-scannable display, but preferably is a liquid crystal display. Associated with the video display portion 126 is a keypad 130 similar to those conventionally used with bank automatic teller machine displays. That is, a plurality of keys 130 are aligned with the portion 126 of raster-scannable display 125 so that the effect of pressing one or more of the keys 130 is explained to a user by the display on the portion 126. Other keypads 130 on other sides of the display 125 may be provided. Additional keypads 42,44 are provided for further transaction entry data to the CRIND microprocessor 140, in conventional fashion. "CRIND" is an acronym for "Card Reader in Dispenser," a style of fuel dispenser sold by Glibarco, Inc. of Greensboro, N.C. Other fuel dispenser manufacturers make similar units. Usage of the term CRIND in this application means fuel dispensers having card reader capabilities, which typically include the capability of communication of card information to a station controller. If desired, the apparatus could be configured for data input through a touch screen.

The screen 125 has a further portion 127 which depicts video images as transmitted as from the station video signal source 135. The screen 125 further has a portion 128 on which is depicted the transaction details for a fueling transaction. The fueling transaction information shown in the portion 128 includes the total currency amount for a fueling transaction, the volume dispensed, usually gallons or liters, and the cost per volume.

The information depicted in the portion 127 can be any desired information, typically of video origin. Thus, advertisements, promotions of community activities or simply, aesthetically attractive scenes can be depicted in a portion 127.

In FIG. 2, the portions 126 and 127 are shown side by side above the portion 128, but any other suitable arrangement of the three portions can be used. However, since the portion 126 typically depicts user prompts for responses such as through the keypad 130, it is desirable to locate portion 126 adjacent to keypad 130. Of course, keypad 130 can be configured other than as shown in FIG. 2. The location of the three portions 126, 127, 128 can change over time under the control of the electronics of display microprocessor 240 supplying the signals to the screen 125.

Figure 3:
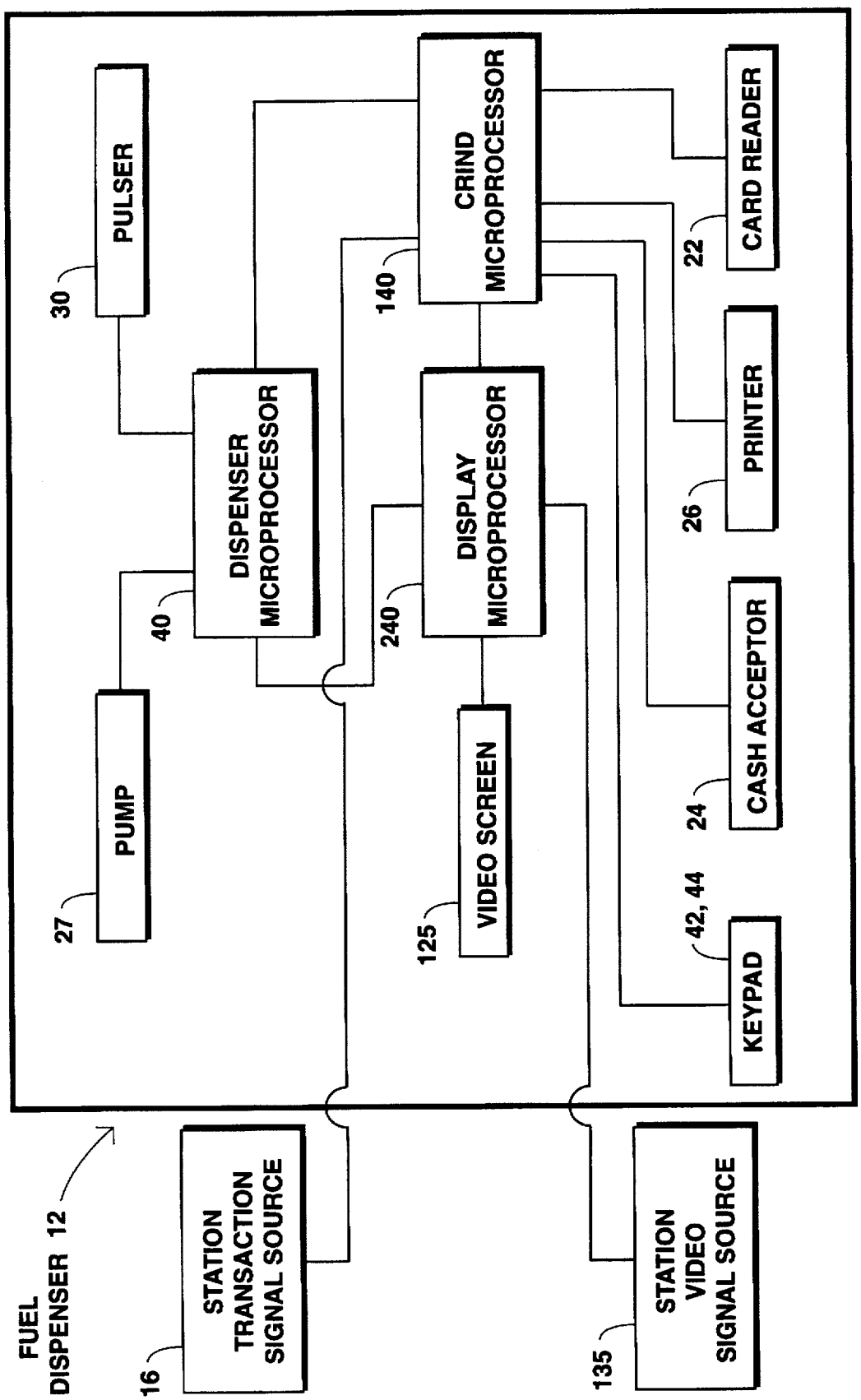
FIG. 3 is a block diagram of various components of the electronics used in a dispenser according to one embodiment.

Referring now to FIG. 3, the video display to the screen 125 is controlled by a display microprocessor 240 which receives input of fueling information from dispenser microprocessor 40, user prompts from CRIND microprocessor 140, and video signals from the station video signal source 135. These three signals can be mixed and controlled for location on the screen using the techniques described in U.S. patent application Ser. No. 07/960,512 filed Oct. 13, 1992, the entire disclosure of which is incorporated herein by reference. Microprocessor 240 may be programmed to convert either the video or the graphics signals to be compatible with the other, such as both RGB, both Composite video or both S-Video.

Input to the display microprocessor 240 from the dispenser microprocessor 40 will be data concerning fuel pumped, which is delivered to the dispenser microprocessor 40 from a conventional pulser 30. The dispenser microprocessor 40 receives commands to dispense fuel from the CRIND microprocessor 140 in conventional fashion, thus, activating the pump 27. The CRIND microprocessor 140 receives inputs from the keypads 42, 44, cash acceptor 24, card reader 22, dispenser microprocessor 40, and station transaction signal sources 16 in conventional fashion. The CRIND microprocessor 140 outputs transaction data to the display microprocessor 240 for combination with the other signals to be displayed on video screen 125. The CRIND microprocessor 140 can output to printer 26 to print a receipt at the end of a transaction. The operation of the CRIND microprocessor 140 with the dispenser microprocessor 40, card reader 22, printer 26, cash acceptor 24, keypads 42, 44, and station transaction signal source 16 is conventional and needs no further elaboration here.

Figure 4:
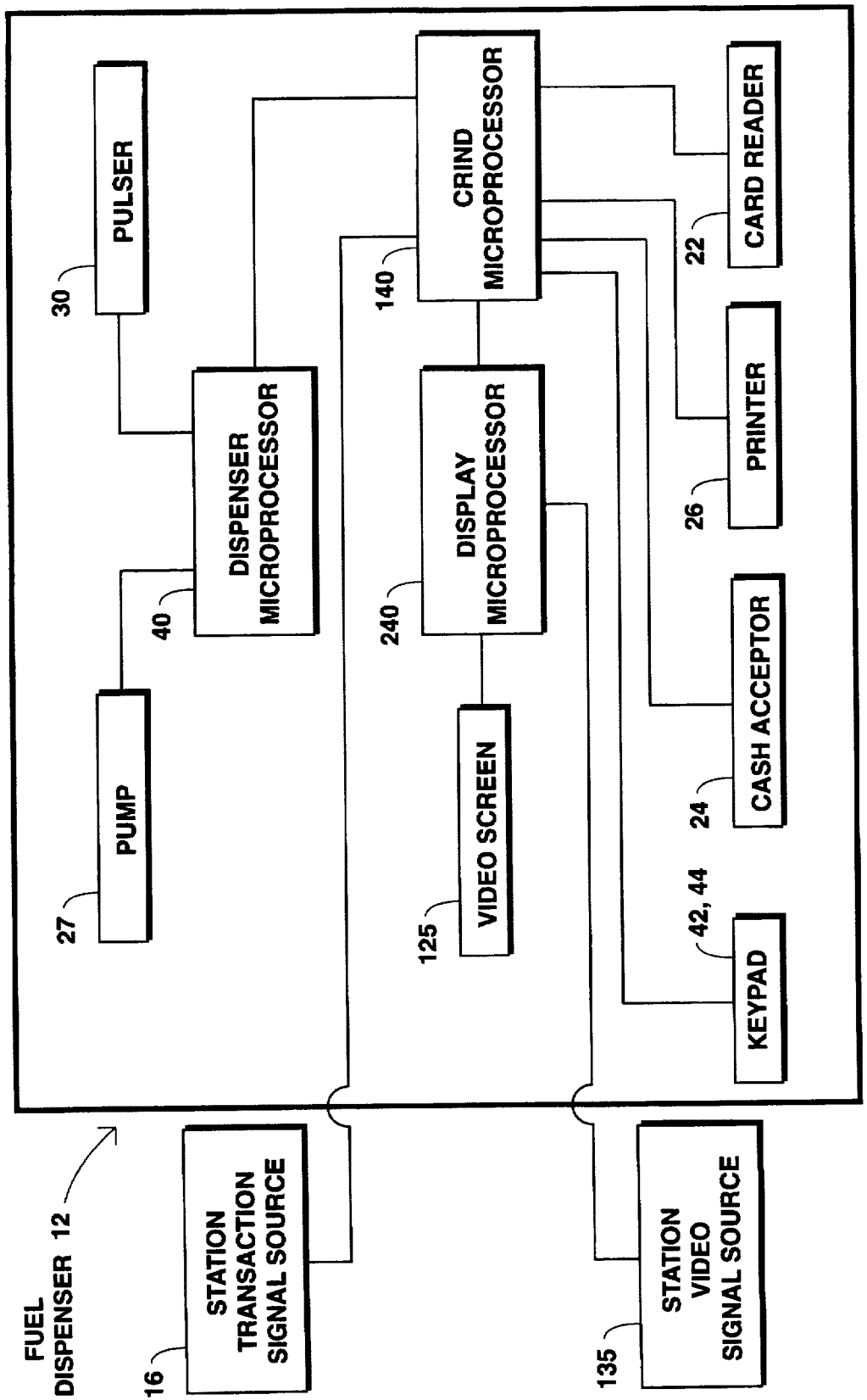
FIG. 4 is a block diagram of various components of the electronics used in a dispenser according to an alternate embodiment

FIG. 4 depicts a system similar to FIG. 3 except that the dispenser microprocessor 40 solely outputs data to the CRIND microprocessor 140, rather than the display microprocessor 240. In this embodiment, of the CRIND microprocessor 140 handles the data concerning the volume of liquid dispensed from the dispenser microprocessor 140, and calculates the current dollar value of the amount dispensed and outputs the same, together with the volume dispensed through the display microprocessor 240, which properly locates them on the video screen 125, along with user prompts as in the embodiment of FIG. 3.

Typically, for a dispenser 12 having two dispensing sides, only one dispenser microprocessor 40 is provided. Each side is provided with a CRIND microprocessor 140 and a display microprocessor 240 as well as the peripherals 22, 24, 26, 42, 44 and 125.

Those of ordinary skill in the art will be able to work with their existing knowledge of fuel dispensers, the disclosure U.S. patent application Ser. No. 07/960,512 and the specifics discussed herein to write suitable software and to configure hardware details to assemble various embodiments according to the invention.

Those of ordinary skill in the art will recognize that the invention as disclosed herein may be implemented in numerous embodiments which differ from the specific disclosure hereof. All such embodiments which fall within the scope of the appended claims are deemed to be within the scope of the patent.

What is claimed is:

1. A system for dispensing fuel at a retail site comprising a fuel dispenser having a raster-scannable display of information to a customer, a first circuit to generate graphics information concerning fueling data for display on said raster-scannable display, a second circuit to generate user prompts for display on said raster-scannable display, a video signal source supplying video signals to said fuel dispenser to be displayed on said raster-scannable display, and a third circuit to direct fueling data from said first circuit, user prompts from said second circuit and video signals from said video signal source selectively to said raster-scannable display as instructed by a circuit other than said third circuit, said video signal source supplying the same video signals to at least one other similarly equipped dispenser.

2. An apparatus as claimed in claim 1 wherein said video signals are analog signals as directed to said raster-scannable display.

3. An apparatus as claimed in claim 1 wherein said fuel dispenser has a user-actuable portion to permit responses to the prompts to be communicated to said second circuit.

4. An apparatus as claimed in claim 1 wherein said dispenser has a fuel meter communicating data about fuel dispensed to said first and second circuits.

5. An apparatus as claimed in claim 1 wherein said second circuit is associated with a reader for cards having magnetic stripes.

6. An apparatus as claimed in claim 5 wherein said second circuit has a communications link to an external card-verifying authority.

7. An apparatus as claimed in claim 5 further comprising a printer and wherein said second circuit has a communications link to said printer.

8. An apparatus as claimed in claim 1 wherein each of said first, second and third circuits includes a microprocessor.

9. An apparatus as claimed in claim 1 wherein said third circuit converts either the video or the graphics signals to be compatible with the other, such as both RGB, both Composite video or both S-Video.

10. An apparatus for dispensing fuel at a retail site comprising a fuel dispenser having a raster-scannable display of information to a customer, a first circuit to generate graphics information concerning fueling data for display on said raster-scannable display, a second circuit to generate user prompts for display on said raster-scannable display, a video signal source supplying video signals to said fuel dispenser to be displayed on said raster-scannable display, and a third circuit to direct fueling data from said first circuit, user prompts from said second circuit and video signals from said video signal source selectively to said raster-scannable display, said third circuit selectively directing graphics information concerning fueling data, graphics information of user prompts or video signals or a combination of them to said raster-scannable display, as instructed by signals provided by said first circuit.

11. An apparatus as claimed in claim 10 wherein said third circuit uses synchronization signals in the video signals to establish graphics information signals synchronized with the video signals.

12. An apparatus as claimed in claim 11 wherein said third circuit determines the placement of graphics information concerning fueling data from said first circuit and Ion said raster-scannable display with video information and said third circuit uses signals provided by said second circuit to the placement of graphics information concerning transactions on said raster-scannable display with video information as desired during a fueling operation.

13. An apparatus for dispensing fuel at a retail site comprising a fuel dispenser having a liquid crystal raster-scannable display of information to a customer, a first circuit to generate graphics information concerning fueling data for display on said liquid crystal raster-scannable display, a second circuit to generate user prompts for display on said liquid crystal raster-scannable display, a video signal source supplying video signals to said fuel dispenser to be displayed on said liquid crystal raster-scannable display, and a third circuit to direct fueling data from said first circuit, user prompts from said second circuit and video signals from said video signal source selectively to said liquid crystal raster-scannable display.

14. An apparatus for dispensing fuel at a retail site comprising a fuel dispenser having a raster-scannable display of information to a customer, a first circuit including a microprocessor to generate graphics information concerning fueling data for display on said raster-scannable display, a reader for cards having magnetic stripes, a printer, a second circuit including a microprocessor to generate user prompts for display on said raster-scannable display and associated with said reader for cards having magnetic stripes and said printer, a communications link between said second circuit and an external card-verifying authority, a fuel meter communicating data about fuel dispensed to said first and second circuits, a user-actuable portion to permit responses to the prompts to be communicated to said second circuit, a video signal source supplying analog video signals to said fuel dispenser to be displayed on said raster-scannable display as analog signals, and a third circuit including a microprocessor to selectively direct graphics information concerning fueling data from said first circuit, graphics information of user prompts from said second circuit and video signals from said video signal source or a combination of them selectively to said raster-scannable display using synchronization signals in the video signals to establish graphics information signals synchronized with the video signals and converting either the video or the graphics signals to be compatible with the other, such as both RGB, both composite video or both S-Video.

15. A method of dispensing fuel at a retail site comprising providing a fuel dispenser having a raster-scannable display of information, generating graphics information concerning fueling transactions for display on the raster-scannable display with a first circuit, generating graphics information concerning user prompts for display on said raster-scannable display with a second circuit, supplying video signals to the fuel dispenser to be displayed on the raster-scannable display, selectively directing graphics information concerning fueling transactions, user prompts or video signals or a combination thereof to the raster-scannable display with a third circuit as instructed by a circuit other than the third circuit, and supplying the same video signals from a common source to at least one other similarly equipped dispenser.

16. A method as claimed in claim 15 wherein the supplying step includes supplying the video signals as analog signals.

17. A method as claimed in claim 15 further comprising providing the fuel dispenser with a user-actuable portion and communicating responses through the portion to affect the graphics information.

18. A method as claimed in claim 15 further comprising communicating data about fuel dispensed from a fuel meter to affect the graphics information concerning fueling transactions.

19. A method as claimed in claim 15 comprising reading information on cards having magnetic stripes and processing the magnetic stripe information to affect the graphics information concerning user prompts.

20. A method as claimed in claim 19 comprising communicating magnetic stripe information to an external card-verifying authority.

21. A method as claimed in claim 15 comprising identifying synchronization signals in the video signals and establishing graphics information signals synchronized with the video signals.

22. A method as claimed in claim 15 comprising converting one of the video or graphics signals to be compatible with the other one of the video or graphics signals, such as both RGB, both Composite video or both S-Video.

23. A method of dispensing fuel at a retail site comprising providing a fuel dispenser having a raster-scannable display of information, generating graphics information concerning fueling transactions for display on the raster-scannable display, generating graphics information concerning user prompts for display on said raster-scannable display, supplying video signals to the fuel dispenser to be displayed on the raster-scannable display, selectively directing graphics information concerning fueling transactions, user prompts or video signals or a combination of them to the raster-scannable display, and detecting beginnings of video programs in the video signals; and starting to direct video signals to the raster-scannable display only at detected program beginnings.

24. A method of dispensing fuel at a retail site comprising providing a fuel dispenser having a raster-scannable display of information, generating graphics information concerning fueling transactions for display on the raster-scannable display with a first circuit, generating graphics information concerning user prompts for display on said raster-scannable display with a second circuit, supplying video signals to the fuel dispenser to be displayed on the raster-scannable display, selectively directing graphics information concerning fueling transactions, user prompts or video signals or a combination of them to the raster-scannable display with a third circuit as instructed by a circuit other than the third circuit, determining the relative placement of graphics information concerning fueling transactions and the placement of graphics information concerning user prompts on the raster-scannable display with video information, and effecting placement of the information concerning fueling data and the information concerning user prompts in relation to the video on the raster-scannable display on the basis of such determination as desired during a fueling operation.

25. A method of dispensing fuel at a retail site comprising providing a fuel dispenser having a raster-scannable display of information, a card reader and a user-actuable portion, generating graphics information concerning fueling transactions for display on the raster-scannable display with a first circuit, communicating data about fuel dispensed from a fuel meter to affect the graphics information concerning fueling transactions, generating graphics information concerning user prompts for display on said raster-scannable display with a second circuit, communicating responses through the user-actuable portion to affect the graphics information concerning user prompts, reading information on cards having magnetic stripes in the card reader and processing the magnetic stripe information to affect the graphics information concerning user prompts with the second circuit, communicating magnetic stripe information to an external card-verifying authority, supplying analog video signals from a single source to the fuel dispenser to be displayed on the raster-scannable display and to other similarly equipped dispensers, and selectively directing graphics information concerning fueling transactions, graphics information concerning user prompts or video signals or a combination of them to the raster-scannable display with a third circuit as instructed by a circuit other than the third circuit.

* * * * *